(12) United States Patent
Shiota et al.

(10) Patent No.: US 10,963,718 B2
(45) Date of Patent: Mar. 30, 2021

(54) MONITORING SYSTEM

(71) Applicant: Yazaki Corporation, Tokyo (JP)

(72) Inventors: Takashi Shiota, Shizuoka (JP); Kentaro Otomo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/675,132

(22) Filed: Nov. 5, 2019

(65) Prior Publication Data

US 2020/0143189 A1    May 7, 2020

(30) Foreign Application Priority Data

Nov. 7, 2018    (JP) .............. JP2018-209418

(51) Int. Cl.
```
G06K 9/20      (2006.01)
G06T 7/70      (2017.01)
G06K 9/00      (2006.01)
H04N 5/235     (2006.01)
H04N 5/265     (2006.01)
```

(52) U.S. Cl.
CPC ....... *G06K 9/2027* (2013.01); *G06K 9/00845* (2013.01); *G06T 7/70* (2017.01); *H04N 5/2354* (2013.01); *H04N 5/265* (2013.01); *G06T 2207/20221* (2013.01); *G06T 2207/30201* (2013.01); *G06T 2207/30268* (2013.01)

(58) Field of Classification Search
CPC ............. G06K 9/2027; G06K 9/00845; G06K 9/00208; G06K 9/00604; G06T 7/70; G06T 2207/20221; G06T 2207/30201; G06T 2207/30268; H04N 5/2354; H04N 5/265; G06F 3/013

See application file for complete search history.

(56) References Cited

U.S. PATENT DOCUMENTS

| 8,350,903 B2 | 1/2013 | Fujimoto et al. |
| 2008/0089559 A1 | 4/2008 | Koumura |
| 2009/0251534 A1* | 10/2009 | Fujimoto ........... G06K 9/00604 348/78 |
| 2017/0323165 A1 | 11/2017 | Haebig |

FOREIGN PATENT DOCUMENTS

| JP | 2008-94221 A | 4/2008 |
| JP | 4356733 B2 | 11/2009 |
| JP | 2010-23626 A | 2/2010 |
| JP | 2010-244156 A | 10/2010 |
| JP | 2017-68385 A | 4/2017 |
| WO | 2016/091736 A1 | 6/2016 |

* cited by examiner

*Primary Examiner* — Nam D Pham
(74) *Attorney, Agent, or Firm* — Kenealy Vaidya LLP

(57) ABSTRACT

A monitoring system includes a pair of a right-side light source and a left-side light source for irradiating the face of an occupant with light, the pair being disposed in the horizontal direction with a camera interposed therebetween when the camera is viewed from the vertical direction. The right-side light source and the left-side light source are alternately turned on for each imaging by the camera. The camera obtains each of a first face image that is imaged in accordance with lighting of the right-side light source and a second face image that is imaged in accordance with lighting of the left-side light source. A controller determines the visual line state based on the first face image, and the second face image that is obtained at a time point proximate to the time point at which the first face image is obtained.

2 Claims, 8 Drawing Sheets

MONITORING SYSTEM

CROSS-REFERENCE TO RELATED APPLICATION(S)

The present application claims priority to and incorporates by reference the entire contents of Japanese Patent Application No. 2018-209418 filed in Japan on Nov. 7, 2018.

BACKGROUND OF THE INVENTION

1. Field of the Invention

The present invention relates to a monitoring system.

2. Description of the Related Art

Conventionally, an eye state detector that detects a visual line state (e.g., blink) of a driver in a vehicle has been proposed (e.g., see Japanese Patent Application Laid-open No. 2008-94221 and Japanese Patent No. 4356733). In such a system for monitoring the driver, imaging is performed by illuminating the face of the driver with a light source that radiates a near-infrared ray (NIR) to take an image of the face with stable quality even in a vehicle affected by disturbance light (e.g., sunlight). Furthermore, conventional monitoring systems include a monitoring system that takes an image of the face of a driver through a visible light cut filter for removing disturbance light.

Meanwhile, there is room for improvement in the above-mentioned monitoring system because at the time of imaging of the face of a driver wearing eyeglasses, imaging of an eye may be disturbed due to a light source reflected on a lens of the eyeglasses in front of the eye, and a visual line state of the driver may not be distinguished from the obtained face image.

SUMMARY OF THE INVENTION

An objective of the present invention is to provide a monitoring system that is capable of accurately monitoring visual line states of an occupant.

In order to achieve the above mentioned object, a monitoring system according to one aspect of the present invention includes a camera that obtains face images by successively imaging a face of an occupant in a vehicle; a pair of a right-side light source and a left-side light source that irradiates the face of the occupant with light, the pair of the right-side light source (11R) and the left-side light source being disposed in a horizontal direction with the camera interposed between the right-side light source and the left-side light source when the camera is viewed from a vertical direction; a lighting controller that alternately turns on the right-side light source and the left-side light source for each imaging by the camera; and a controller that determines a visual line state including at least opening/closing of eyes of the occupant by using a plurality of the face images obtained with the camera, and performs vehicle control based on a result of the determination, wherein the camera obtains each of a first face image that is imaged in accordance with lighting of the right-side light source and a second face image that is imaged in accordance with lighting of the left-side light source, and the controller determines the visual line state based on the first face image, and the second face image that is obtained at a time point proximate to a time point at which the first face image is obtained.

According to another aspect of the present invention, in the monitoring system, it is possible to further include that a face direction determination unit that determines the direction of the face of the occupant by using the face images; a face image segmentation unit that segmentalizes the first face image into a first right-face image, which is the right-face side of the occupant facing the right-side light source, and a first left-face image, which is the left-face side, in which a distance to the left-face side of the occupant from the right-side light source is longer than a distance to the right-face side of the occupant from the right-side light source, and the second face image into a second left-face image, which is the left-face side of the occupant facing the left-side light source, and a second right-face image, which is the right-face side, in which a distance the right-face side of the occupant from the left-side light source is longer than a distance to the left-face side of the occupant from the left-side light source, when the direction of the face of the occupant is determined to be directly forward when viewed from the camera; and a face image synthesis unit that creates one face image by synthesizing the first left-face image and the second right-face image, wherein the controller determines the visual line state based on the face image created by the face image synthesis unit.

According to still another aspect of the present invention, in the monitoring system, it is possible to further include that a face direction determination unit that determines the direction of the face of the occupant by using the face images, wherein the lighting controller turns on the left-side light source when the face of the occupant is determined to be rotated to the right direction when viewed from the camera, and turns on the right-side light source when the face of the occupant is determined to be rotated to the left direction when viewed from the camera, the camera obtains each of a face image for independent determination that is imaged in accordance with lighting of the right-side light source, and a face image for independent determination that is imaged in accordance with lighting of the left-side light source, and the controller determines the visual line state based on the face images for independent determination.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a monitoring system according to the present invention will now be described in detail with reference to the attached drawings. The present invention is not limited to the embodiment described below. Components in the embodiment described below include those that can be easily conceived by one skilled in the art, or those that are substantially identical thereto. In addition, the components in the embodiment described below can be variously omitted, replaced, or changed within the scope of the present invention.

Embodiment

Figure 1:
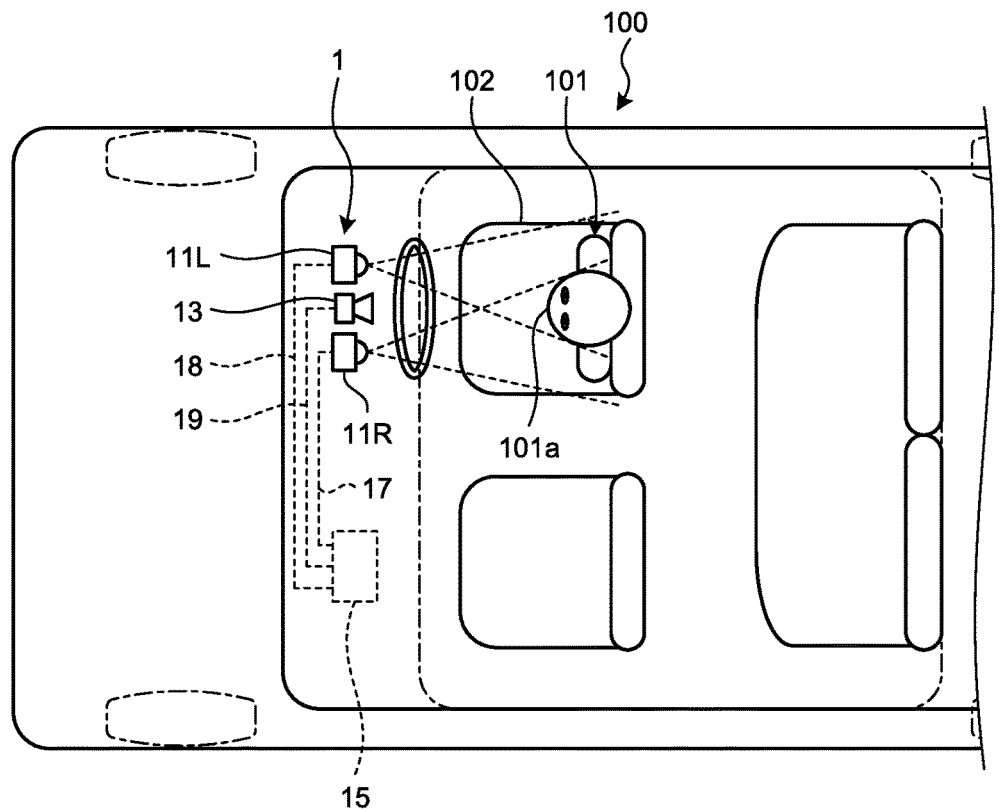
FIG. 1 is a schematic diagram illustrating a schematic configuration of an interior of a vehicle to which a monitoring system according to an embodiment is applied.

A monitoring system according to an embodiment of the present invention will be described with reference to FIG. 1 to FIG. 11. As illustrated in FIG. 1, a monitoring system 1 is installed in a vehicle 100 such as an automobile, for monitoring visual line states of an occupant 101 seated on a seat 102 of the vehicle 100, and performing various kinds of processing on the occupant 101. The visual line states refer to the states of an eye including opening/closing of the eye (blink). The occupant 101 is the target of monitoring by the monitoring system 1, and is, for example, a driver of the vehicle 100. In the present embodiment, the occupant 101 wears eyeglasses 101c. The present embodiment describes a case in which the vehicle 100 is an automobile. However, the vehicle 100 may be, for example, a bus, train, or the like.

Figure 2:
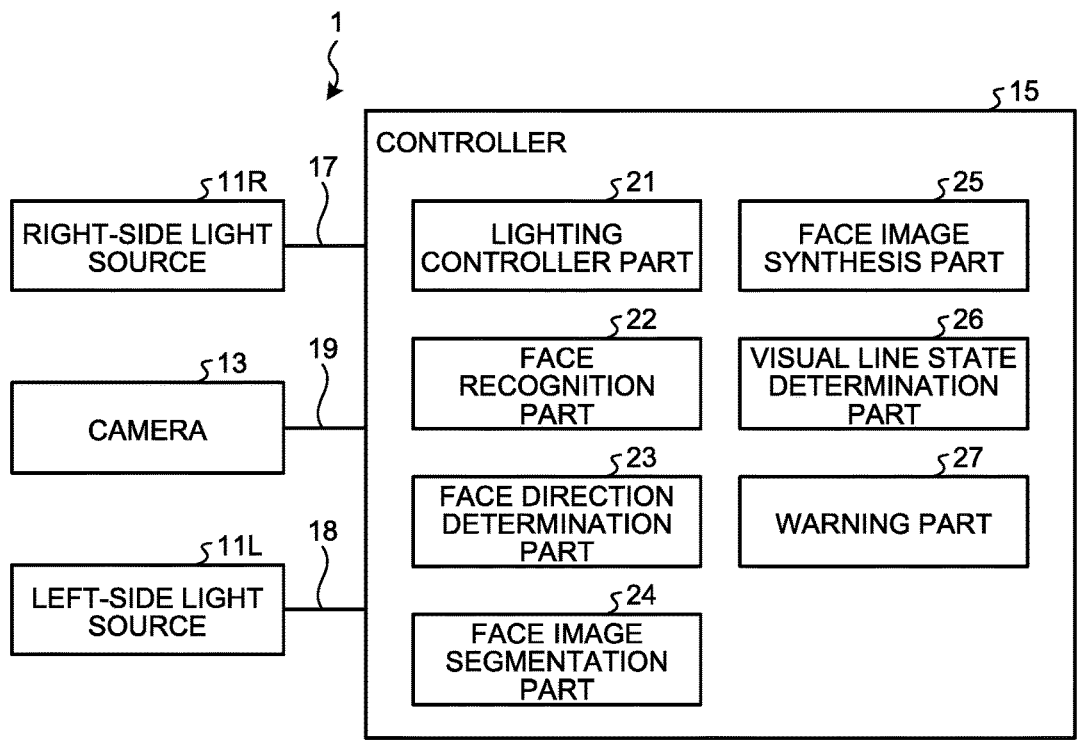
FIG. 2 is a block diagram illustrating the schematic configuration of the monitoring system according to the embodiment.

As illustrated in FIG. 2, the monitoring system 1 includes a right-side light source 11R, a left-side light source 11L, a camera 13, and a controller 15 serving as the controller. The monitoring system 1 operates by receiving power from a battery (not illustrated) or the like within the vehicle 100.

The right-side light source 11R and the left-side light source 11L are a pair of light sources for irradiating a face 101a of the occupant 101 with light, the pair being disposed in the horizontal direction with the camera 13 interposed therebetween when the camera 13 is viewed from the vertical direction. Each of the right-side light source 11R and the left-side light source 11L is a light source that radiates a near-infrared ray, and is made of, for example, a near-infrared light emitting diode (near-infrared LED). Each of the right-side light source 11R and the left-side light source 11L illuminates the face of the occupant 101 seated on the seat 102 of the vehicle 100. The right-side light source 11R and the left-side light source 11L are installed, for example, within an instrument panel (not illustrated) of the vehicle 100.

The right-side light source 11R is electrically connected to the controller 15 through a signal wire 17, and the light therefrom is turned on/off in accordance with a light-on signal or light-off signal from the controller 15. The left-side light source 11L is electrically connected to the controller 15 through a signal wire 18, and the light therefrom is turned on/off in accordance with a light-on signal or light-off signal from the controller 15. Each of the right-side light source 11R and the left-side light source 11L is controlled by the controller 15 such that light emission is performed in accordance with the imaging timing of the camera 13. The light emission herein refers to light emission in which the state of the light sources (the right-side light source 11R and the left-side light source 11L) changes from light-on to light-off in accordance with the light-on signal and the light-off signal sequentially output from the controller 15.

Figure 8:
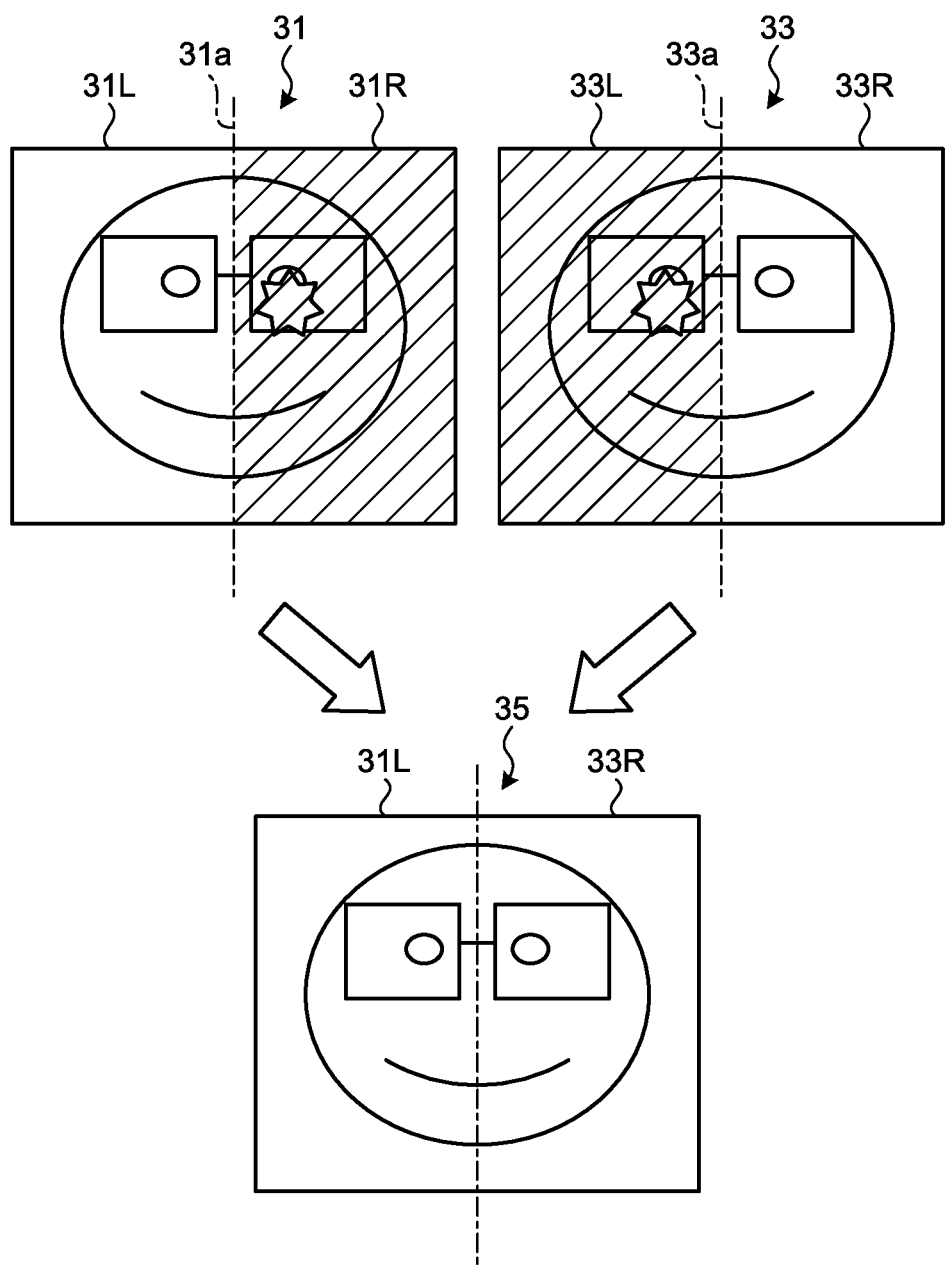
FIG. 8 is a schematic diagram for describing segmentation and synthesis of a face image by the monitoring system according to the embodiment.
Figure 11A:
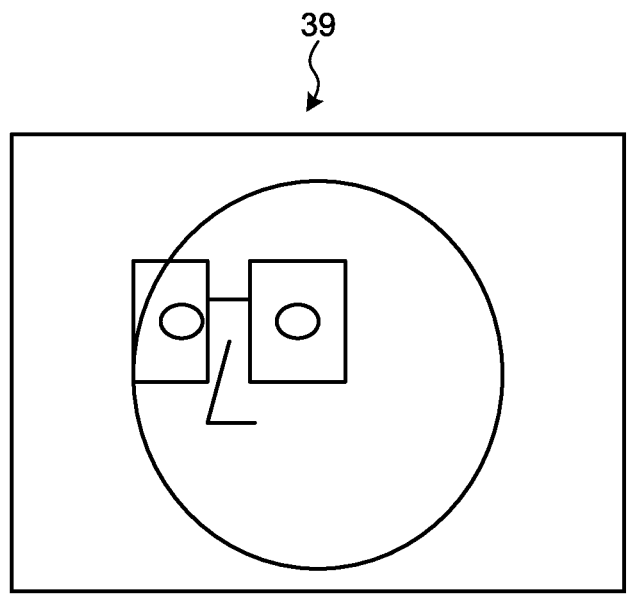
FIG. 11A and FIG. 11B are schematic diagrams illustrating examples of a face image for independent determination of the monitoring system according to the embodiment.
Figure 11B:
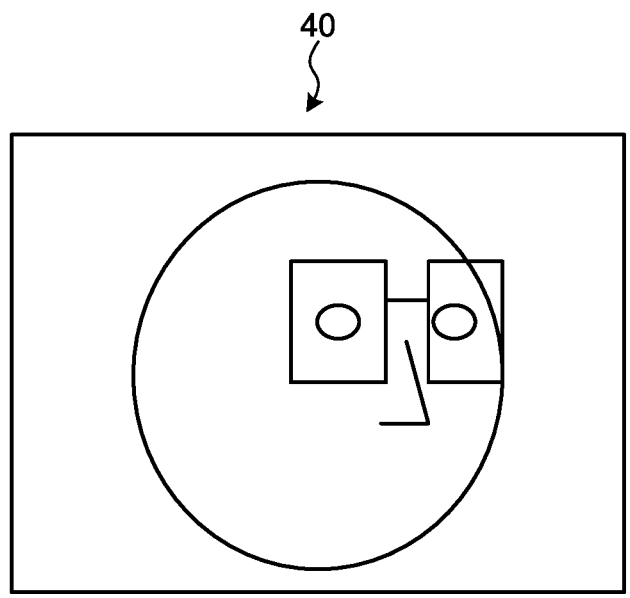

The camera 13 obtains face images by successively imaging the face 101a of the occupant 101 in the vehicle 100. The camera 13 is a camera that is capable of performing imaging with both of visible light rays and infrared light rays, as illumination light. As illustrated in FIG. 8, for example, the camera 13 can obtain each of a first face image 31 that is imaged in accordance with lighting of the right-side light source 11R, and a second face image 33 that is imaged in accordance with lighting of the left-side light source 11L. In addition, as illustrated in FIG. 11, the camera 13 can obtain each of a face image for independent determination 39 that is imaged in accordance with lighting of the right-side light source 11R, and a face image for independent determination 40 that is imaged in accordance with lighting of the left-side light source 11L. The camera 13 is connected to the controller 15 through a signal wire 19, and a plurality of face images successively imaged at fixed timings are output to the controller 15. The camera 13 performs imaging in accordance with a control signal received from the controller 15. The camera 13 is installed in the front direction from the seat 102 of the occupant 101, and is, for example, installed within an instrument panel (not illustrated) of the vehicle 100. An imaging interval of the camera 13 is preferably set in consideration of a general blink speed (e.g., 100 to 150 msec), and is for example, set to 15 msec. The imaging interval of the camera 13 is not limited thereto.

The controller 15 is a part that integrally controls modules of the monitoring system 1. The controller 15 executes various kinds of arithmetic processing for monitoring visual line states of the face 101a of the occupant 101 and controlling modules of the vehicle 100. The controller 15 includes an electronic circuit mainly composed of a well-known microcomputer including a processor such as a central processing unit (CPU), a micro processing unit (MPU), an application specific integrated circuit (ASIC), or a field programmable gate array (FPGA), read only memory (ROM), random access memory (RAM), and an interface. The controller 15 uses the face images obtained with the camera 13 to determine the visual line states including opening/closing of an eye 101b of the occupant 101, and performs vehicle control based on the determination result. The controller 15 inputs the face images from the camera 13. The controller 15 determines the visual line states based on, among the face images, the first face image 31 and the second face image 33 that is obtained at a time point proximate to the time point at which the first face image 31 is obtained. The controller 15 includes a lighting control part 21, a face recognition part 22, a face direction determination part 23, a face image segmentation part 24, a face image synthesis part 25, a visual line state determination part 26, and a warning part 27. These are some of the functions provided for the controller 15, and besides these parts, a function to control the modules of the vehicle 100 may also be provided.

The lighting control part 21 is an example of the lighting controller, and has a function to alternately turn on the right-side light source 11R and the left-side light source 11L for each imaging by the camera 13. The lighting control part 21 outputs the light-on signal to the right-side light source 11R when turning on the right-side light source 11R, and outputs the light-on signal to the left-side light source 11L when turning on the left-side light source 11L. The lighting control part 21 outputs the light-on signal to both of the right-side light source 11R and the left-side light source 11L when turning on both of the right-side light source 11R and the left-side light source 11L. In addition, the lighting control part 21 outputs the light-off signal to the right-side light source 11R when turning off the right-side light source 11R, and outputs the light-off signal to the left-side light source 11L when turning off the left-side light source 11L. The lighting control part 21 outputs the light-off signal to both of the right-side light source 11R and the left-side light source 11L when turning off both of the right-side light source 11R and the left-side light source 11L. The lighting control part 21 outputs the light-on signal and the light-off signal to the right-side light source 11R and the left-side light source 11L in conjunction with the imaging by the camera 13. Specifically, since a visual line state is determined based on the first face image 31, which is imaged in accordance with the lighting of the right-side light source 11R, and the second face image 33, which is imaged in accordance with the lighting of the left-side light source 11L, the lighting control part 21 successively and alternatively outputs the light-on signal and the light-off signal to the right-side light source 11R and the left-side light source 11L for each imaging by the camera 13.

The face recognition part 22 extracts feature points (e.g., the face contour, the shapes and positions of eyes, a nose, and a mouth, and whether eyeglasses are worn) by analyzing the face images input from the camera 13. For example, a well-known face recognition algorithm such as eigenface using principal component analysis, linear discriminant analysis, elastic bunch graph matching, hidden Markov model, or dynamic link comparison by neuron motivation may be used as a face recognition method. The face recognition part 22 outputs the extracted feature points to the face direction determination part 23. The face recognition part 22 may be configured so as to determine whether a person is the registered person based on the extracted feature points, by performing comparison with face images registered in advance.

The face direction determination part 23 is an example of the face direction determination unit, and has a function to determine the direction of the face 101a of the occupant 101 using the face images. The face direction determination part 23 can determine whether the face 101a of the occupant 101 included in the face images faces directly the camera 13, i.e., whether the face 101a is directed forward, based on the feature points extracted by the face recognition part 22. In addition, the face direction determination part 23 can determine whether the face 101a of the occupant 101 included in the face images is rotated to the right direction when viewed from the camera 13, i.e., whether the face 101a is directed to the right side, by analyzing the face images input from the camera 13. Furthermore, the face direction determination part 23 can determine whether the face 101a of the occupant 101 included in the face images is rotated to the left direction when viewed from the camera 13, i.e., whether the face 101a is directed to the left side, by analyzing the face images input from the camera 13.

The face image segmentation part 24 is an example of the face image segmentation unit, and has a function to segmentalize the first face image 31 into a first right-face image 31R, which is the right-face side of the occupant facing the right-side light source 11R, and a first left-face image 31L, which is the left-face side, in which a distance thereto from the right-side light source 11R is longer than a distance to the right-face side of the occupant 101 from the right-side light source 11R, when it is determined that the direction of the face 101a of the occupant 101 is directly forward when viewed from the camera 13. In addition, the face image segmentation part 24 has a function to segmentalize the second face image 33 into a second left-face image 33L, which is the left-face side of the occupant 101 facing the left-side light source 11L, and a second right-face image 33R, which is the right-face side, in which a distance thereto from the left-side light source 11L is longer than a distance to the left-face side from the left-side light source 11L, when it is determined that the direction of the face 101a of the occupant 101 is directly forward when viewed from the camera 13.

The face image synthesis part 25 is an example of the face image synthesis unit, and has a function to create one face image by synthesizing the first left-face image 31L and the second right-face image 33R. As illustrated in FIG. 8, the controller 15 determines the visual line state based on a synthesized face image 35 that is synthesized with the face image synthesis part 25, and gives warning or the like to the occupant 101 based on the determination result.

The visual line state determination part 26 is an example of the controller, and has a function to determine a visual line state based on a first face image, and a second face image that is obtained at a time point proximate to the time point at which the first face image is obtained. As illustrated in FIG. 11, the visual line state determination part 26 determines the visual line state of the occupant 101 based on the face image for independent determination 39, which is imaged in accordance with lighting of the right-side light source 11R, and the face image for independent determination 40, which is imaged in accordance with lighting of the left-side light source 11L. The controller 15 determines the visual line state using the face images for independent determination 39, 40 obtained with the camera 13, and gives warning or the like to the occupant 101 based on the determination result.

The warning part 27 is an example of the controller, and has a function to give warning to the occupant 101. The warning part 27 alerts the occupant 101 by, for example, making warning sound or vibrating the seat 102. The warning method of the warning part 27 is not limited thereto. For example, the warning method may be such a method that gives out an odor or exerts an electronic or physical impact, as long as it alerts the occupant 101.

Figure 3:
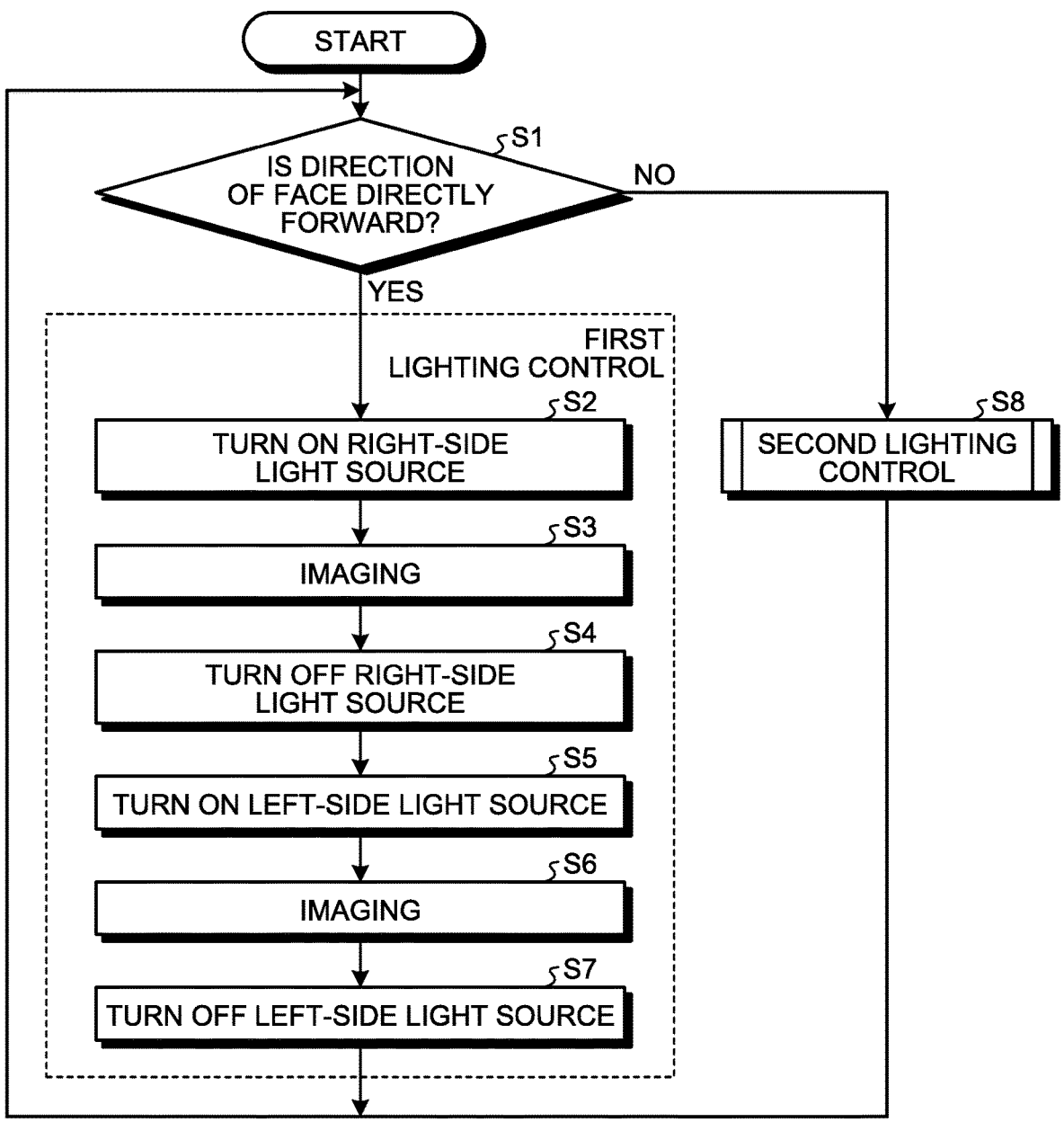
FIG. 3 is a flowchart illustrating an example of first lighting control by a controller of the monitoring system according to the embodiment.

The following describes first lighting control in the monitoring system 1 with reference to FIG. 3.

At Step S1, the face direction determination part 23 determines whether the direction of the face is directly forward. For example, the face direction determination part 23 uses the face images obtained with the camera 13 to determine whether the face 101a of the occupant 101 faces directly the camera 13. When the direction of the face 101a is not directly forward, the processing moves to second lighting control processing at Step S8. On the other hand, when the direction of the face 101a is directly forward, the processing moves to first lighting control processing at Step S2 to Step S7.

Figure 6:
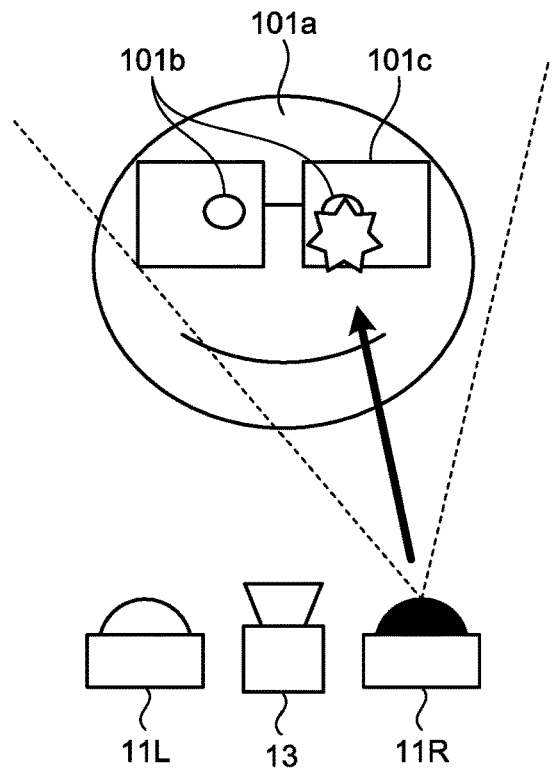
FIG. 6 is a schematic diagram illustrating an example of the state when turning on a right-side light source of the monitoring system according to the embodiment.

At Step S2, as illustrated in FIG. 6, the lighting control part 21 turns on the right-side light source 11R. The right-side light source 11R becomes a light-on state when receiving the light-on signal of the lighting control part 21 from the controller 15.

At Step S3, the camera 13 images the face 101a of the occupant 101 illuminated with the right-side light source 11R to obtain face images, and outputs data of the face images to the controller 15.

At Step S4, the lighting control part 21 turns off the right-side light source 11R. The right-side light source 11R becomes a light-off state when receiving the light-off signal of the lighting control part 21 from the controller 15.

Figure 7:
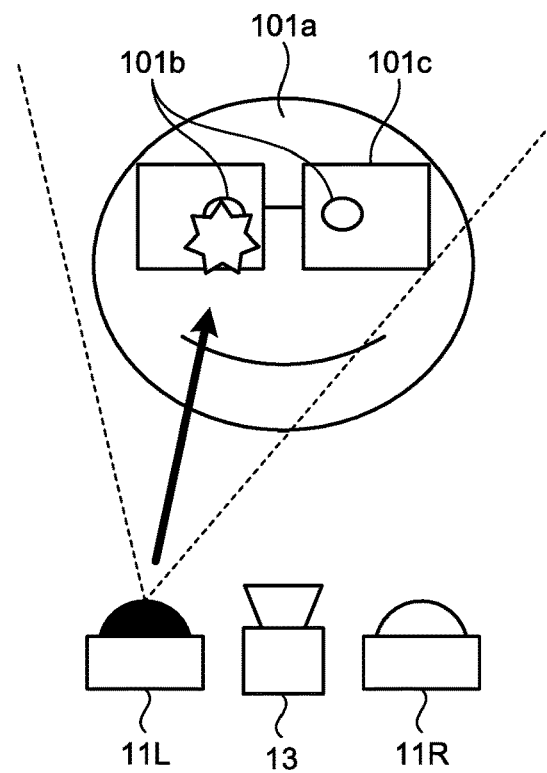
FIG. 7 is a schematic diagram illustrating an example of the state when turning on a left-side light source of the monitoring system according to the embodiment.

At Step S5, as illustrated in FIG. 7, the lighting control part 21 turns on the left-side light source 11L. The left-side light source 11L becomes a light-on state when receiving the light-on signal of the lighting control part 21 from the controller 15.

At Step S6, the camera 13 images the face 101a of the occupant 101 illuminated with the left-side light source 11L to obtain face images, and outputs data of the face images to the controller 15.

At Step S7, the lighting control part 21 turns off the left-side light source 11L. The left-side light source 11L becomes a light-off state when receiving the light-off signal of the lighting control part 21 from the controller 15, and the processing returns to Step S1.

Figure 4:
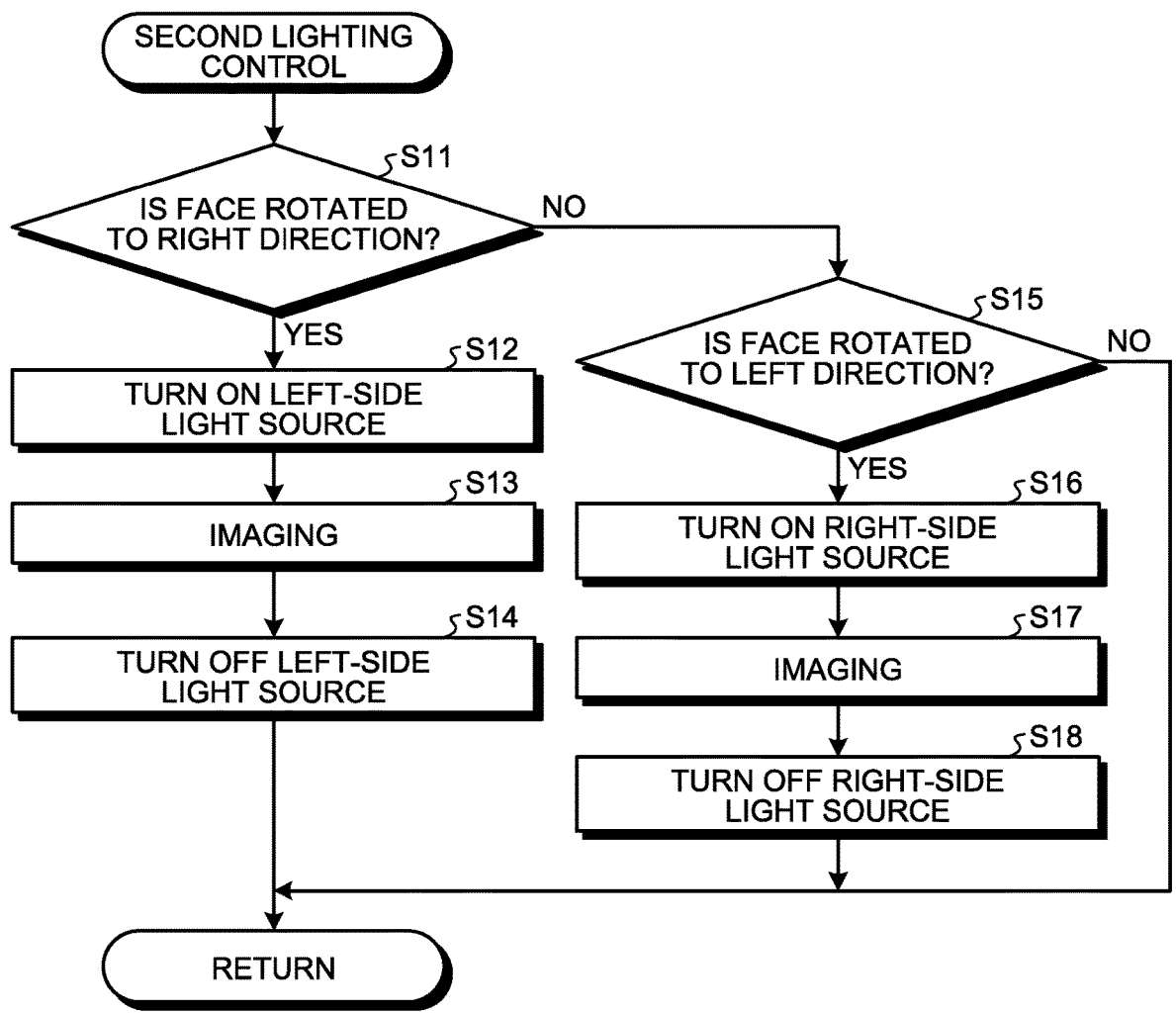
FIG. 4 is a flowchart illustrating an example of second lighting control by the controller of the monitoring system according to the embodiment.

The following describes second lighting control in the monitoring system 1 with reference to FIG. 4. This processing is the second lighting control processing at Step S8 in FIG. 3.

Figure 10:
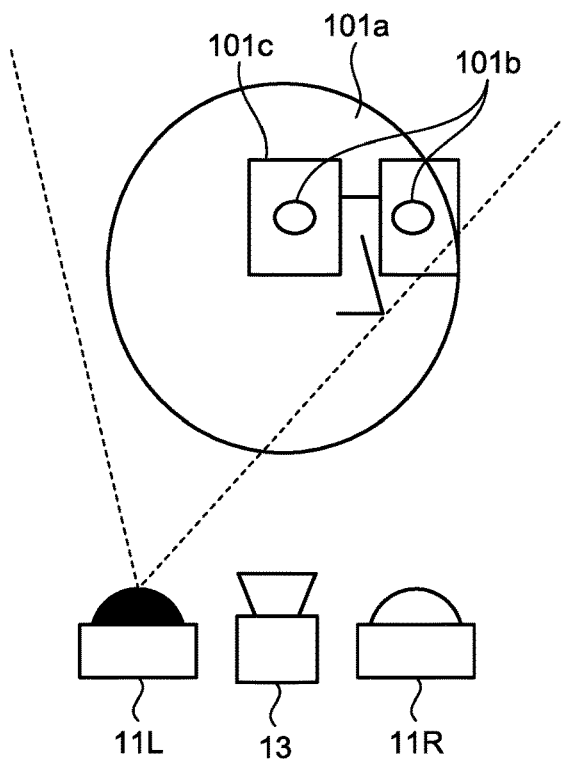
FIG. 10 is a schematic diagram illustrating another example of the state when turning on the left-side light source of the monitoring system according to the embodiment.

At Step S11, the face direction determination part 23 determines whether the face is rotated to the right direction. For example, the face direction determination part 23 uses the face images obtained with the camera 13 to determine whether the face 101a of the occupant 101 is rotated to the right direction when viewed from the camera 13. As illustrated in FIG. 10, the face direction determination part 23 moves to Step S12 when it is determined that the face 101a is rotated to the right direction. On the other hand, when it is determined that the face 101a is not rotated to the right direction, the processing moves to Step S15.

At Step S12, the lighting control part 21 turns on the left-side light source 11L as in the case of the above-described Step S5. The left-side light source 11L becomes the light-on state when receiving the light-on signal of the lighting control part 21 from the controller 15.

At Step S13, the camera 13 images the face 101a of the occupant 101 illuminated with the left-side light source 11L to obtain face images, and outputs data of the face images to the controller 15, as in the case of the above-described Step S6.

At Step S14, the lighting control part 21 turns off the left-side light source 11L as in the case of the above-described Step S7. The left-side light source 11L becomes the light-off state when receiving the light-off signal of the lighting control part 21 from the controller 15, and the processing is completed and returned.

Figure 9:
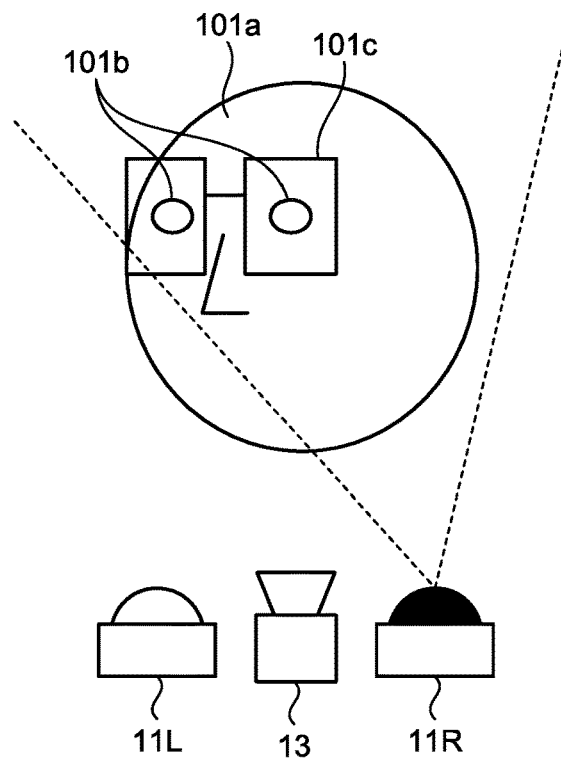
FIG. 9 is a schematic diagram illustrating another example of the state when turning on the right-side light source of the monitoring system according to the embodiment.

At Step S15, the face direction determination part 23 determines whether the face is rotated to the left direction. For example, the face direction determination part 23 uses the face images obtained with the camera 13 to determine whether the face 101a of the occupant 101 is rotated to the left direction when viewed from the camera 13. As illustrated in FIG. 9, when it is determined that the face 101a is rotated to the right direction, the face direction determination part 23 moves to Step S16. On the other hand, when it is determined that the face 101a is not rotated to the left direction, the processing is completed and returned.

At Step S16, the lighting control part 21 turns on the right-side light source 11R as in the case of the above-described Step S2. The right-side light source 11R becomes the turn-on state when receiving the light-on signal of the lighting control part 21 from the controller 15.

At Step S17, the camera 13 images the face 101a of the occupant 101 illuminated with the right-side light source 11R to obtain face images, and outputs data of the face images to the controller 15, as in the case of the above-described Step S3.

At Step S18, the lighting control part 21 turns off the right-side light source 11R as in the case of the above-described Step S4. The right-side light source 11R becomes the light-off state when receiving the light-off signal of the lighting control part 21 from the controller 15, and the processing is completed and returned.

Figure 5:
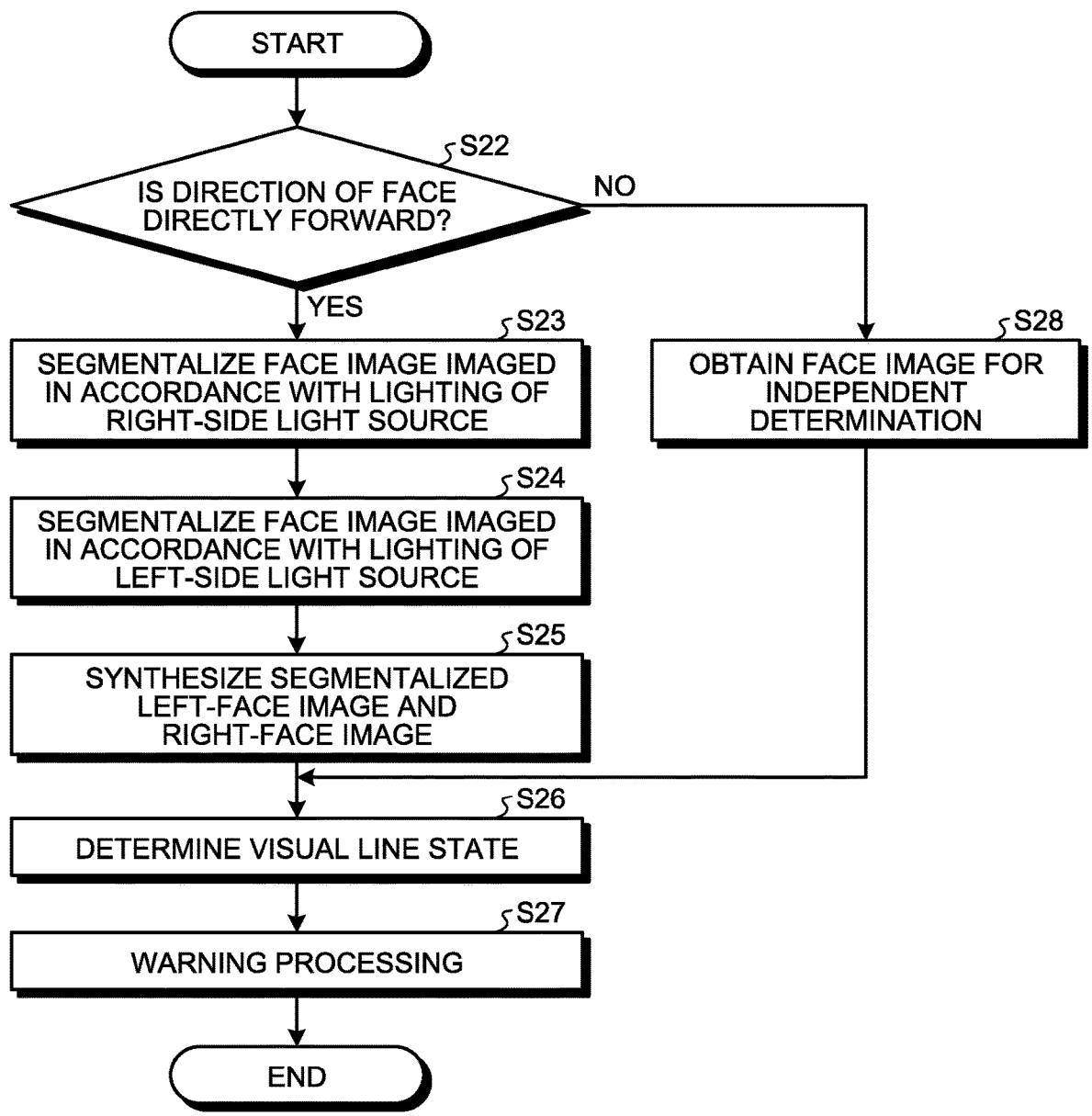
FIG. 5 is a flowchart illustrating an example of the determination on a visual line state by the controller of the monitoring system according to the embodiment.

The following describes determination processing on a visual line state of the monitoring system 1 with reference to FIG. 5 and FIG. 8.

At Step S22, the face direction determination part 23 determines whether the direction of the face is directly forward. For example, the face direction determination part 23 uses the face images obtained with the camera 13 to determine whether the face 101a of the occupant 101 faces directly the camera 13. When the direction of the face 101a is not directly forward, the processing moves to Step S28 (Step of obtaining face image for independent determination). On the other hand, when the direction of the face 101a is directly forward, the processing moves to Step S23.

At Step S23, as illustrated in FIG. 8, the face image segmentation part 24 segmentalizes the first face image 31 into the first right-face image 31R, which is the right-face side of the occupant 101 facing the right-side light source 11R, and the first left-face image 31L, which is the left-face side, in which a distance thereto from the right-side light source 11R is longer than a distance to the right-face side of the occupant 101 from the right-side light source 11R. The first face image 31 is segmentalized into the first right-face image 31R and the first left-face image 31L with a face center line 31a interposed therebetween. The first face image 31 according to the present embodiment is, for example, in a state in which the right-side light source 11R is reflected on the right-side lens of the eyeglasses 101c, and the visual line direction of the right eye of the occupant 101 is not accurately determinable.

At Step S24, as illustrated in FIG. 8, the face image segmentation part 24 segmentalizes the second face image 33 into the second left-face image 33L, which is the left-face side of the occupant 101 facing the left-side light source 11L, and the second right-face image 33R, which is the right-face side, in which a distance thereto from the left-side light source 11L is longer than a distance to the left-face side of the occupant 101 from the left-side light source 11L. The second face image 33 is segmentalized into the second right-face image 33R and the second left-face image 33L with a face center line 33a interposed therebetween. The second face image 33 according to the present embodiment is, for example, in a state in which the left-side light source 11L is reflected on the left-side lens of the eyeglasses 101c, and the visual line direction of the left eye of the occupant 101 is not accurately determinable.

Then, at Step S25, the face image synthesis part 25 creates one face image by synthesizing the first left-face image 31L segmentalized at Step S23 and the second right-face image 33R segmentalized at Step S24.

At Step S26, the visual line state determination part 26 determines the visual line state of the occupant 101 based on the face image created with the face image synthesis part 25 at Step S25. For example, the visual line state determination part 26 estimates that the occupant 101 is dosing when the eye 101b of the occupant 101 is frequently closed.

At Step S27, the warning part 27 gives warning to the occupant 101 in a predetermined method based on the visual line state determined at Step S26, and the processing is completed. For example, the warning part 27 alerts the occupant 101 by making warning sound.

As described above, the monitoring system 1 according to the present embodiment includes a pair of the right-side light source 11R and the left-side light source 11L for irradiating the face 101a of the occupant 101 with light, the pair being disposed in the horizontal direction with the camera 13 interposed therebetween when the camera 13 is viewed from the vertical direction. The right-side light source 11R and the left-side light source 11L are alternately turned on for each imaging by the camera 13. The camera 13 obtains each of the first face image 31, which is imaged in accordance with the lighting of the right-side light source 11R, and the second face image 33, which is imaged in accordance with lighting of the left-side light source 11L. The controller 15 determines the visual line state based on the first face image 31, and the second face image 33 that is obtained at a time point proximate to the time point at which the first face image 31 is obtained.

The monitoring system 1 according to the present embodiment is, for example, capable of determining the visual line state of a face on the side on which a light source is not reflected on a lens of eyeglasses, and capable of accurately monitoring the state of the eye 101b even in the case of the occupant 101 wearing the eyeglasses 101c. Conventionally, when the face of an occupant wearing eyeglasses is imaged by causing two light sources to emit light at the same time, imaging of the eyes may be disturbed due to reflection of the light sources on the respective lenses of the eyeglasses. In this case, the visual line state of the driver may not be distinguished from the obtained face image, and monitoring of the visual line state of the occupant may be difficult. Thus, the first face image 31, which is imaged in accordance with lighting of the right-side light source 11R, and the second face image 33, which is imaged in accordance with lighting of the left-side light source 11L, are obtained to determine the visual line state based on the first face image 31, and the second face image 33 obtained at a time point proximate to the time point at which the first face image 31 is obtained. In this manner, even in the case of monitoring the visual line state of an occupant wearing eyeglasses, a face image in which a light source is not reflected on one of the lenses of the eyeglasses can be obtained, and since there are a plurality of the face images in time series, a change in the visual line of the occupant over time can be determined. As a result, monitoring accuracy can be improved without changing a conventional system configuration. In addition, while conventionally light emitted onto the face of an occupant from two light sources is reduced through a polarization plate, if such a polarization plate is not used, the cost of components can be reduced. This polarization plate reduces radiation intensity (intensity of light emitted onto the face) of infrared illumination, thereby increasing the number of LEDs serving as light sources or the current consumption value of the LEDs to obtain required radiation intensity. Thus, the cost of components can be further kept low if the polarization plate becomes unnecessary.

Furthermore, in the monitoring system 1 according to the present embodiment, when the direction of the face 101a of the occupant 101 is determined to be directly forward when viewed from the camera 13, the face image segmentation part 24 segmentalizes the first face image 31 into the first right-face image 31R, which is the right-face side of the occupant 101 facing the right-side light source 11R, and the first left-face image 31L, which is the left-face side, in which a distance thereto from the right-side light source 11R is longer than a distance to the right-face side of the occupant 101 from the right-side light source 11R. Furthermore, the second face image 33 is segmentalized into the second left-face image 33L, which is the left-face side of the occupant 101 facing the left-side light source 11L, and the second right-face image 33R, which is the right-face side, in which a distance thereto from the left-side light source 11L is longer than a distance to the left-face side of the occupant 101 from the left-side light source 11L. The face image synthesis part 25 creates a single synthesized face image 35 by synthesizing the first left-face image 31L and the second right-face image 33R. The controller 15 determines the visual line state based on the synthesized face image 35 created with the face image synthesis part 25. With the above-described configuration, the visual line state can be determined using the created synthesized face image 35, and the state of the eye 101b can be accurately monitored even in the case of the occupant 101 wearing the eyeglasses 101c.

In addition, in the monitoring system 1 according to the present embodiment, the lighting control part 21 turns on the left-side light source 11L when the face of the occupant 101 is determined to be rotated to the right direction when viewed from the camera 13, and turns on the right-side light source 11R when the face 101a of the occupant 101 is determined to be rotated to the left direction when viewed from the camera 13. The camera 13 obtains each of the face image for independent determination 39, which is imaged in accordance with lighting of the right-side light source 11R, and the face image for independent determination 40, which is imaged in accordance with lighting of the left-side light source 11L. The controller 15 determines the visual line state based on the face images for independent determination 39, 40. With the above-described configuration, the light source to be turned on is controlled in accordance with the direction of the face 101a of the occupant 101, and the visual line state is determined by using face images that are imaged in accordance with lighting of the respective light sources. Thus, the visual line state can be determined by using face images in which the light sources are not reflected on the lenses of the eyeglasses. As a result, the state of the eye 101b can be accurately monitored even in the case of the occupant 101 wearing the eyeglasses 101c.

In the above-described embodiment, when the direction of the face 101a of the occupant 101 is determined to be directly forward when viewed from the camera 13, the visual line state is determined based on the synthesized face image 35 created with the face image synthesis part 25. However, the present invention is not limited thereto. For example, the visual line state may be determined based on the first face image 31 and the second face image 33 without segmentalizing each of the face images into the left-face image and the right-face image. Specifically, when imaging the face of an occupant wearing eyeglasses, even if the direction of the face is directly forward when viewed from the camera, the light sources are not necessarily reflected on the lenses of the eyeglasses. Thus, the visual line states of both eyes of the occupant 101 in each of the face images, which are the first face image 31 and the second face image 33, may be determined. In this manner, processing of segmentalizing and synthesizing face images becomes unnecessary, and time required for processing of determining the visual line state can be shortened.

In addition, each of the face images may be segmentalized into the first left-face image 31L and the first right-face image 31R, and the second left-face image 33L and the second right-face image 33R, and the visual line state may be determined based on the segmentalized face images. For example, the visual line state of one eye of the occupant 101 in each of the left-face images, which are the first left-face image 31L and the second left-face image 33L, may be determined, or the visual line state of one eye of the occupant 101 in each of the right-face images, which are the first right-face image 31R and the second right-face image 33R, may be determined. In this manner, processing of synthesizing face images becomes unnecessary, and time required for processing of determining the visual line state can be shortened.

In the above-described embodiment, the monitoring system 1 alternately turns on the right-side light source 11R and the left-side light source 11L for each imaging by the camera 13 regardless of whether the occupant 101 wears the eyeglasses 101c. However, the present invention is not limited thereto. For example, the lighting method of the right-side light source 11R and the left-side light source 11L may be varied depending on whether the occupant 101 wears the eyeglasses 101c. Specifically, when the occupant 101 does not wear the eyeglasses 101c, the right-side light source 11R and the left-side light source 11L are caused to emit light at the same time for each imaging by the camera 13, and when the occupant 101 wears the eyeglasses 101c, the right-side light source 11R and the left-side light source 11L are alternately turned on for each imaging by the camera 13. In this manner, when the occupant 101 does not wear the eyeglasses 101c, the face 101a of the occupant 101 can be evenly illuminated, and thus generation of an unnecessary shade in face images obtained with imaging can be inhibited, thereby allowing accurate monitoring of the visual line state of the occupant 101. In this regard, examples of a method of determining whether the occupant 101 wears the eyeglasses 101c include a method of analyzing face images obtained from the camera 13.

A monitoring system according to the present embodiment exerts an effect that the visual line state of an occupant can be accurately monitored.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring system, comprising:
a camera that obtains face images by successively imaging a face of an occupant in a vehicle;
a pair of a right-side light source and a left-side light source that irradiates the face of the occupant with light, the pair of the right-side light source and the left-side light source being disposed in a horizontal direction with the camera interposed between the right-side light source and the left-side light source when the camera is viewed from a vertical direction;
a lighting controller that alternately turns on the right-side light source and the left-side light source for each imaging by the camera; and
a controller that determines a visual line state including at least opening/closing of eyes of the occupant by using a plurality of the face images obtained with the camera, and performs vehicle control based on a result of the determination, wherein
the camera obtains each of a first face image that is imaged in accordance with lighting of the right-side light source and a second face image that is imaged in accordance with lighting of the left-side light source, and
the controller determines the visual line state based on the first face image, and the second face image that is obtained at a time point proximate to a time point at which the first face image is obtained, and further comprising:
a face direction determination unit that determines the direction of the face of the occupant by using the face images;
a face image segmentation unit that segmentalizes the first face image into a first right-face image, which is the right-face side of the occupant facing the right-side light source, and a first left-face image, which is the left-face side, in which a distance to the left-face side of the occupant from the right-side light source is longer than a distance to the right-face side of the occupant from the right-side light source, and the second face image into a second left-face image, which is the left-face side of the occupant facing the left-side light source, and a second right-face image, which is the right-face side, in which a distance the right-face side of the occupant from the left-side light source is longer than a distance to the left-face side of the occupant from the left-side light source, when the direction of the face of the occupant is determined to be directly forward when viewed from the camera; and
a face image synthesis unit that creates one face image by synthesizing the first left-face image and the second right-face image, wherein
the controller determines the visual line state based on the face image created by the face image synthesis unit.

2. A monitoring system, comprising:
a camera that obtains face images by successively imaging a face of an occupant in a vehicle;
a pair of a right-side light source and a left-side light source that irradiates the face of the occupant with light, the pair of the right-side light source and the left-side light source being disposed in a horizontal direction with the camera interposed between the right-side light source and the left-side light source when the camera is viewed from a vertical direction;
a lighting controller that alternately turns on the right-side light source and the left-side light source for each imaging by the camera; and
a controller that determines a visual line state including at least opening/closing of eyes of the occupant by using a plurality of the face images obtained with the camera, and performs vehicle control based on a result of the determination, wherein
the camera obtains each of a first face image that is imaged in accordance with lighting of the right-side light source and a second face image that is imaged in accordance with lighting of the left-side light source, and the controller determines the visual line state based on the first face image, and the second face image that is obtained at a time point proximate to a time point at which the first face image is obtained, and further comprising:

a face direction determination unit that determines the direction of the face of the occupant by using the face images, wherein the lighting controller turns on the left-side light source when the face of the occupant is determined to be rotated to the right direction when viewed from the camera, and turns on the right-side light source when the face of the occupant is determined to be rotated to the left direction when viewed from the camera, the camera obtains each of a face image for independent determination that is imaged in accordance with lighting of the right-side light source, and a face image for independent determination that is imaged in accordance with lighting of the left-side light source, and the controller determines the visual line state based on the face images for independent determination.

* * * * *